Figure 3:
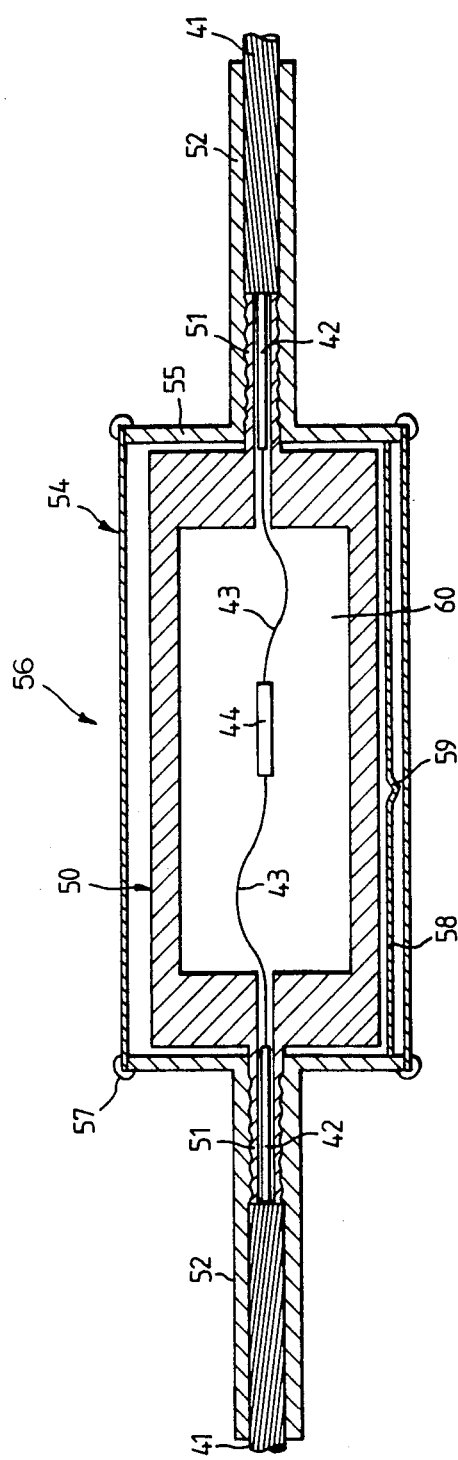

United States Patent [19]

Harvey

[11] Patent Number: 4,494,822
[45] Date of Patent: Jan. 22, 1985

[54] OVERHEAD ELECTRIC AND OPTICAL TRANSMISSION SYSTEMS

[75] Inventor: Peter Harvey, London, England

[73] Assignee: BICC Public Limited Company, London, England

[21] Appl. No.: 389,682

[22] Filed: Jun. 18, 1982

[30] Foreign Application Priority Data

Jun. 18, 1981 [GB] United Kingdom ............... 8118737

[51] Int. Cl.³ .............................................. G02B 7/26
[52] U.S. Cl. ............................. 350/96.21; 174/50.53; 174/70 A; 339/137; 339/147 R; 350/96.23
[58] Field of Search ............... 350/96.20, 96.21, 96.22, 350/96.23; 361/331, 332; 339/111, 119 R, 120, 124, 136 R, 137, 143 C, 147 R; 174/44, 45 R, 50.52, 50.53, 50.54, 70 R, 70 A

[56] References Cited

U.S. PATENT DOCUMENTS

| 3,970,783 | 7/1976 | Lukas ............................ 174/70 R X |
| 4,359,598 | 11/1982 | Dey et al. ..................... 174/70 R X |
| 4,392,714 | 7/1983 | Brüggendieck et al. ........ 350/96.23 |

FOREIGN PATENT DOCUMENTS

| 52-13346 | 2/1977 | Japan ................. 350/96.21 |
| 55-76313 | 6/1980 | Japan ................. 350/96.21 |

OTHER PUBLICATIONS

Igarashi et al., "Composite Fiber-Optic Overhead Ground Wire," *Conf. Proc. of 29th Int. Wire & Cable Symp.*, Nov. 1980, pp. 312-321.

Maddock et al., "Optical Fibers in Overhead Power Transmission Systems . . . ," *Conf. Proc. of 29th Int. Wire & Cable Symp.*, Nov. 1980, pp. 402-409.

*Primary Examiner*—John Lee
*Attorney, Agent, or Firm*—Buell, Ziesenheim, Beck & Alstadt

[57] ABSTRACT

In an inexpensive and simple method of effecting a joint between two overhead electric conductors incorporating optical fibres or between an overhead electric conductor incorporating an optical fibre and an optical cable extending to a sub-station or other location, at least a part of each or the overhead conductor is introduced into a metal sleeve extending from a wall of a metal housing and the sleeve is compression jointed to the conductor to effect a mechanical and electrical joint between the conductor and the housing. The part of the conductor protruding into the housing is cut back and a joint is effected between the optical fibres of the two overhead conductors or between the optical fibres of the overhead conductor and the optical cable that has been introduced into the housing. The housing is sealed to render it fluid tight and is preferably filled with petroleum jelly. An elongate metal shroud may be assembled around the metal housing and be so shaped as to provide aerodynamic and corona protection.

43 Claims, 4 Drawing Figures

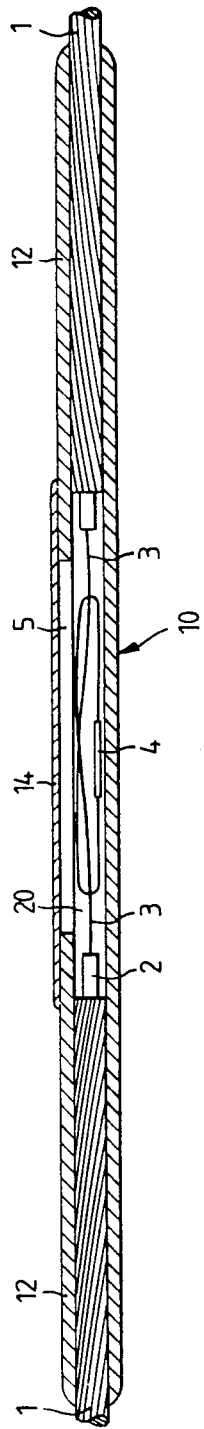
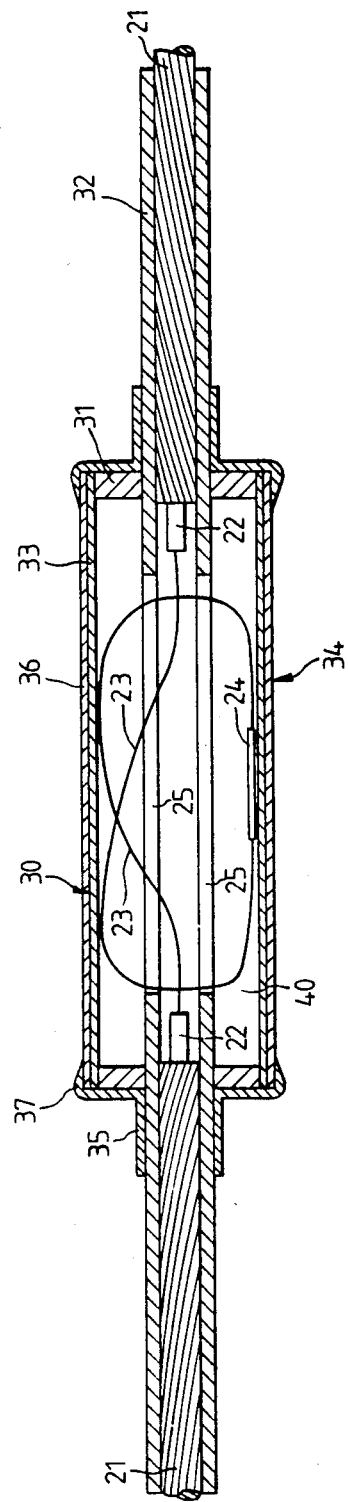

OVERHEAD ELECTRIC AND OPTICAL TRANSMISSION SYSTEMS

This invention relates to overhead electric transmission systems of the kind in which one or more than one overhead electric conductor is freely supported in long lengths between towers, pylons, masts or other upstanding supports mutually spaced along the system, all such supports, for convenience, being included in the generic term "tower".

The invention is particularly concerned with overhead electric and optical transmission systems of this kind in which the overhead electric conductor, or at least one of the overhead electric conductors, includes at least one optical guide for use in the communications field adapted for transmission of light and comprises a substantially circumferentially rigid central core having an elongate compartment within and extending throughout the length of the core, at least one separate optical fibre and/or at least one optical bundle loosely housed in the elongate compartment and, surrounding the central core, at least one layer of helically wound bare elongate elements of metal or metal alloy. By the expression "optical bundle" is meant a group of optical fibres or a group of fibres including at least one optical fibre and including at least one non-optical reinforcing fibre or other reinforcing elongate member. Such an overhead electric conductor is described and claimed in the Complete specification of our U.K. Pat. No. 1598438.

An overhead electric and optical transmission system of the aforesaid kind in which the overhead electric conductor, or at least one of the overhead electric conductors, has, loosely housed in an elongate compartment in a central core, at least one separate optical fibre and/or optical bundle for the transmission of light, will hereinafter, for convenience, be referred to as "an overhead electric transmission system of the kind described".

In an overhead electric and optical transmission system of the kind in which the overhead electric conductor, or at least one of the overhead electric conductors, includes an optical guide, it is usually necessary at spaced positions along the system to effect a joint between the optical guides of two overhead electric conductors suspended from a tower or towers or between the optical guides of an overhead electric conductor suspended from a tower and of a cable extending to a sub-station or other location.

It is an object of the present invention to provide, for use in an overhead electric and optical transmission system of the kind described, an improved method of effecting a joint between two overhead electric conductors, or between an overhead electric conductor and a cable extending to a sub-station or other location.

According to the invention, the method comprises introducing at least a part of each or the overhead electric conductor into a sleeve of metal or metal alloy of high electrical conductivity integral with or secured to a wall of a housing of metal or metal alloy; compression jointing the sleeve to the overhead electric conductor to effect a mechanical and electrical joint between the conductor and the housing; cutting back each or the conductor or a part thereof protruding into the housing and effecting the joint or joints between the separate optical fibres and/or optical bundles of the two overhead electric conductors or between the separate optical fibres and/or optical bundles of the overhead electric conductor and of a cable that has been introduced into the housing; and sealing the housing to render it substantially fluid-tight.

Preferably, the layer or layers of helically wound bare metal elongate elements of each or the overhead electric conductor is or are cut back to expose a length of the central core, the exposed length of central core of each or the overhead electric conductor is introduced through one of the sleeves or the sleeve into the housing and, after each or the sleeve has been compression jointed to the overhead electric conductor, each or the exposed length of central core protruding into the housing is cut back to enable the optical fibre and/or optical bundle joint or joints to be made.

The method of the present invention provides a mid-span joint between two overhead electric conductors to form a continuous conductor, or a joint between a continuous overhead electric conductor and a cable extending to a sub-station or other location, which, by appropriate selection of wall thickness and metal or metal alloy of the housing, can have a strength equal to or substantially greater than the ultimate tensile strength of each or the overhead electric conductor. Preferably, the metal or metal alloy of the housing is of high electrical conductivity so that the housing is capable of carrying the full overload current of the overhead electric conductors.

In the case of a mid-span joint between two overhead electric conductors, preferably the sleeves to be compression jointed to the overhead electric conductors are end parts of a tube which constitutes the metal housing and which, at at least one position intermediate of its length, has at least one slot or other aperture through which the optical fibres and/or optical bundles of the overhead electric conductors can be withdrawn to facilitate effecting of the optical fibre joint or joints, the jointed fibres then being re-introduced through the slot or other aperture into the tube and the slot or other aperture sealed to render the tube substantially fluid-tight. Preferably, the tube constituting the metal housing is of substantially circular transverse cross-section and has an external diameter approximating to that of each of the sleeves. Sealing of the tube is preferably effected by securing a metal plate of arcuate transverse cross-section over the or each slot or other aperture.

Alternatively, the sleeves to be compression jointed to the overhead electric conductors constitute end parts of a tube which extends through, and protrudes from each end of, the metal housing and which at at least on position within the housing has at least one slot or other aperture through which the optical fibres and/or optical bundles of the overhead electric conductors can be withdrawn to enable the optical fibre joint or joints to be effected.

An elongate shroud of metal or metal alloy preferably is assembled around the metal housing and is of such a transverse cross-sectional shape as to provide both aerodynamic and corona protection for the joint.

Before applying the sleeve and compression jointing the sleeve to one of the overhead electric conductors or to the overhead electric conductor, at least a part of the overhead electric conductor may be introduced into a tubular spigot integral with or secured to a wall of the metal housing and, in this case, the sleeve is compression jointed both to the tubular spigot and to the overhead electric conductor. In this case, preferably each or the sleeve is compression-jointed to the associated tubular spigot before one of the overhead electric conductors or the overhead electric conductor or the exposed length of central core of one of the overhead electric conductors or of the overhead electric conductor is introduced through the tubular spigot into the housing. Each or the sleeve may be compression-jointed to the associated tubular spigot in the factory before the housing is taken to site.

The joint or joints between the separate optical fibres and/or optical bundles of the two overhead electric conductors or between the separate optical fibres and/or optical bundles of the overhead electric conductor and of the cable may be effected in any convenient manner but, in all cases, preferably the or each optical fibre joint is a fusion joint. Where optical fibres are jointed by means of a connector which provides for disconnection of the joint if required, preferably the or each joint is secured in and with respect to the metal housing. Prior to effecting the or each optical fibre and/or optical bundle joint, preferably an excess length of each optical fibre and/or optical bundle to be connected at the joint is drawn into the housing to provide a spare length of optical fibre and/or optical bundle should the or an optical fibre and/or optical bundle joint ever need to be re-made or repaired.

According to a further aspect of the invention we provide, in an overhead electric and optical transmission system of the kind described, an improved joint between two overhead electric conductors, or between an overhead electric conductor and a cable extending to a substation or other location, wherein the joint or joints between the optical fibres and/or optical bundles of the overhead electric conductors or of the overhead electric conductor and the cable is or are enclosed within a substantially fluid-tight elongate housing of metal or metal alloy having protruding from each or one of its ends a sleeve through which at least a part of one of the overhead electric conductors or of the overhead electric conductor extends and which is compression jointed to said overhead electric conductor to provide a mechanical and electrical connection between the metal housing and said overhead electric conductor.

Preferably, an exposed length of the central core of each or the overhead electric conductor protrudes through one of the sleeves or the sleeve into the metal housing.

Preferably, also, an elongate shroud of metal or metal alloy surrounds the metal housing and, with a view to reducing the effect of wind on the joint, is of substantially cylindrical shape and of substantially circular cross-section. The external circumferential edge of each end wall of the shroud may be enclosed within a separately formed ring having a transverse cross-section of partially spherical shape, the ring serving as a corona ring. In a preferred embodiment, the end walls of the shroud are separately formed with respect to the circumferential wall of the shroud and the circumferential wall is preferably divided lengthwise of the shroud into two separately formed parts. The circumferential wall of the shroud may be sealed to the end walls to form a substantially fluid-tight chamber; where it is not hermetically sealed it may be provided with one or more than one hole for drainage of rainwater.

Each or the sleeve is preferably made of drawn high strength substantially pure aluminium and, where the housing is of a metal or metal alloy of high electrical conductivity, the housing is preferably made of aluminium or an aluminium alloy. Where the housing is of a metal or metal alloy of high electrical conductivity, the shroud is preferably of stainless steel; where the housing is of galvanised mild steel or other metal or metal alloy of relatively low electrical conductivity, preferably at least one strap of aluminium or an aluminium-based alloy or of other metal or metal alloy of high electrical conductivity extends between and is connected to the end walls of the shroud between the metal housing and the circumferential wall of the shroud.

Any space within the metal housing is preferably filled with a petroleum-based water-impermeable jelly-like material, for instance petroleum jelly or any other water-impermeable material of a grease-like nature. Other materials with which the metal housing may be filled include plastics foam and cold setting resin.

Where the optical cable and/or optical bundles are those of an overhead electric conductor suspended from a tower and of a cable extending to a sub-station or other location, the shroud of the joint may be omitted and the means for effecting an electrical connection to the overhead electric conductor may comprise a flange integral with or secured to the sleeve or metal housing. In this case, the cable extending from a sub-station or other location may effect a substantially fluid-tight seal with the wall of the metal housing by means of a conventional gland. The end of the metal housing remote from the overhead electric conductor may carry a clevis or tongue for mechanically connecting the metal housing to an insulator or insulator string suspended from the tower.

In all cases, in addition to the joints between the optical fibres and/or optical bundles, the metal housing may also accommodate regenerators and/or ancilliary equipment associated with the optical transmission system.

Figure 4:
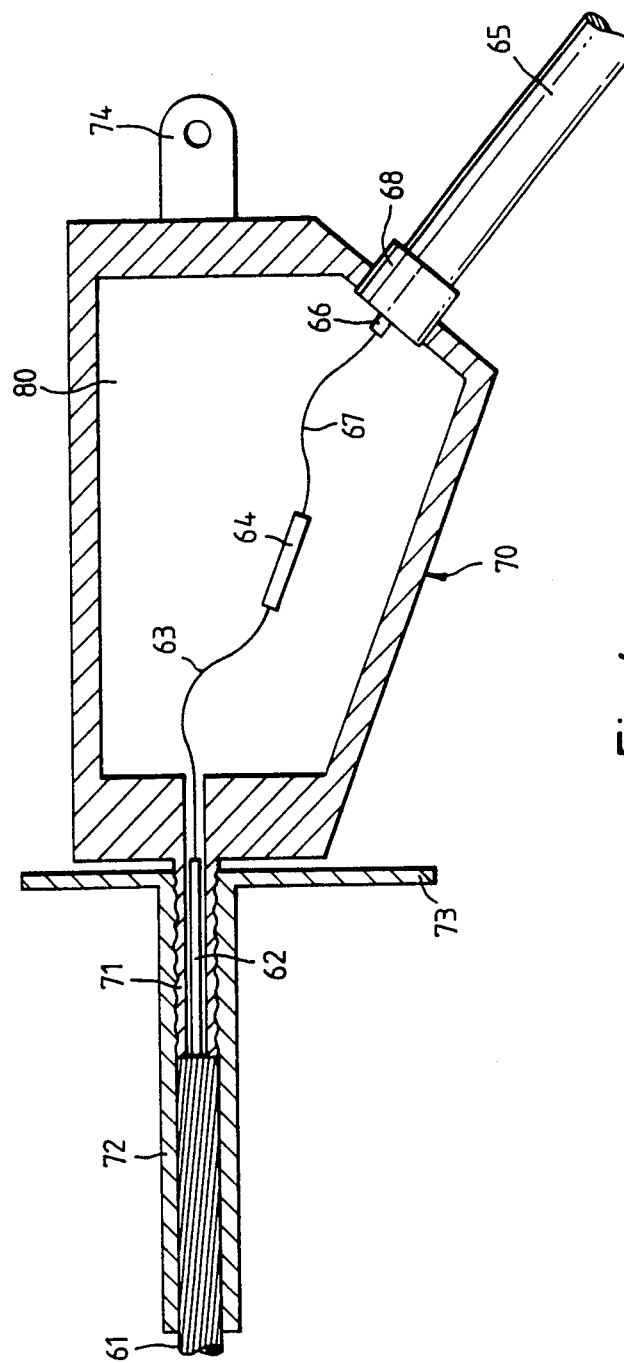

The invention is further illustrated by a description, by way of example, of two preferred mid-span joints between two overhead electric conductors supported by towers of an overhead electric and optical transmission system of the kind described, of an alternative form of mid-span joint, and of a preferred dead end of an overhead electric conductor of an overhead electric transmission system of the kind described, with reference to the accompanying diagrammatic drawings, in which:

FIG. 1 is a fragmental sectional side elevation of one preferred mid-span joint, FIG. 2 is a fragmental sectional side elevation of the second preferred mid-span joint, FIG. 3 is a fragmental sectional side elevation of the alternative form of mid-span joint, and FIG. 4 is a sectional side elevation of the preferred dead end.

Referring to FIG. 1, each of the two overhead electric conductors 1 connected at the joint to form a continuous conductor has, loosely housed in an elongate compartment in a central core 2, an optical fibre 3 for the transmission of light. In effecting the joint, layers of helically wound bare wires of each overhead electric conductor 1 surrounding the central core 2 are cut back to expose a length of the central core and the two overhead electric conductors with the exposed lengths of central core protruding from them are introduced into the opposite ends 12 of a tube 10 of drawn high strength 99.5% aluminium. The ends 12 of the tube 10 are compression jointed to the overhead electric conductors 1 to effect a mechanical and electrical joint between the conductors. Optical fibres 3 protruding from the central cores 2 of the overhead electric conductors 1 are withdrawn through a slot 5 in the wall of the tube 10 and an optical fibre fusion joint 4 is effected between the optical fibres. The optical fibre fusion joint 4 and the adjoining lengths of optical fibres 3 are then re-introduced into the tube 10 and the slot 5 in the tube is sealed by an arcuate plate 14 which is secured to the tube to form a substantially fluid-tight housing. The tube is filled with petroleum jelly 20.

Referring to FIG. 2, each of the two overhead electric conductors 21 connected at the joint to form a continuous conductor has, loosely housed in an elongate compartment in a central core 22, an optical fibre 23 for the transmission of light. In effecting the joint, layers of helically wound bare wires of each overhead electric conductor 21 surrounding the central core 22 are cut back to expose a length of the central core and the two overhead electric conductors with the exposed lengths of central core protruding from them are introduced into the opposite ends of a tube 32 of drawn high strength 99.5% aluminium. The ends of the tube 32 are compression jointed to the overhead electric conductors 21 to effect a mechanical and electrical joint between the conductors. Optical fibres 23 protruding from the central cores 22 of the overhead electric conductors 21 are fed through one of two slots 25 in the wall of the tube 32 and an optical fibre fusion joint 24 is effected between the optical fibres. An elongate housing 30 of elongate transverse cross-section comprising end walls 31 and a peripheral wall 33 of aluminium-based alloy is built up around that part of the tube 32 between the compression joints to the overhead electric conductors 21 to form a substantially fluid-tight housing. The housing is filled with petroleum jelly 40.

An elongate shroud 34 of stainless steel of substantially circular cross-section comprising end walls 35 and a circumferential wall 36 is built up around the metal housing 30, the shape of the shroud providing aerodynamic protection for the point. Parts 37 of the end walls 35 overlying the circumferential wall 36 of the shroud 34 are of such a shape as to provide corona protection for the joint. The shroud 34 has several holes (not shown) in its circumferential wall 36 to provide for drainage of rainwater.

Referring to FIG. 3, each of the two overhead electric conductors 41 connected at the joint to form a continuous conductor has, loosely housed in an elongate compartment in a central core 42, an optical fibre 43 for the transmission of light. In effecting the joint, layers of helically wound bare wires of each overhead electric conductor 41 surrounding the central core 42 are cut back to expose a length of the central core and the exposed length of the central core of each overhead electric conductor is introduced through one of two tubular spigots 51 integral with end walls of an elongate housing 50 of galvanised mild steel. A sleeve 52 of 99.5% pure aluminium is applied over each tubular spigot 51 and over an adjacent part of the overhead electric conductor 41 and is compression jointed to the tubular spigot and to the overhead electric conductor to effect a mechanical and electrical joint between the conductor and the steel housing 50. The part of the central core 42 of each overhead conductor 41 protruding into the steel housing 50 is cut back to expose a length of optical fibre 43 and an optical fibre joint 44 is effected between the optical fibres of the two overhead conductors, the joint being secured in and with respect to the steel housing. The steel housing 50 is then filled with petroleum jelly 60 and is closed by a removable cover (not shown) in such a way that the housing is sealed to render it substantially fluid-tight.

Integral with the end of each sleeve 52 nearer the steel housing 50 is a circular flange 55 which is to constitute an end wall of an elongate shroud 54 of aluminium-based alloy which is to surround the steel housing. The shroud 54 has a circumferential wall 56 which is separately formed with respect to the end walls 55 and which is divided lengthwise of the shroud into two separately formed parts. The circumferential wall 56 of the shroud 54 is sealed to the end walls 55 to form a substantially fluid-tight chamber, the external circumferential edge of each end wall 55 being enclosed within a separately formed ring 57 having a transverse cross-section of partially spherical shape, the ring serving as a corona ring.

To keep the wall thickness of the shroud 54 as thin as possible and still ensure a good electrical connection between the two overhead electric conductors 41, a strap 58 of aluminium or aluminium-based alloy extends between and is welded to the end walls 55 of the shroud between the stainless steel housing 50 and the circumferential wall 56 of the shroud. The strap 58 has a kink 59 between its ends to accommodate for expansion or contraction of the joint.

As will be seen on referring to FIG. 4, the continuous overhead electric conductor 61 which is to be terminated at the dead end and whose optical fibre is to be connected to the optical fibre of an optical cable 65 extending to a sub-station, has a central core 62 in an elongate compartment of which is loosely housed an optical fibre 63. The optical cable 65 extending to the sub-station has an optical cable element 66 in a bore of which is loosely housed an optical fibre 67. In effecting the dead end, layers of helically wound bare wires of the overhead electric conductor 61 are cut back to expose a length of the central core 62 and the optical cable 65 is cut back to expose a length of the optical cable element 66. The exposed length of the central core 62 of the overhead conductor 61 is introduced into a tubular spigot 71 integral with an end wall of a housing 70 of galvanised mild steel. A sleeve 72 of 99.5% pure aluminium is applied over the tubular spigot 71 and over an adjacent part of the overhead electric conductor 61 and is compression jointed to the tubular spigot and to the overhead electric conductor to effect a mechanical and electrical joint between the conductor and the steel housing 70. The optical cable 65 extending from a sub-station effects a substantially fluid-tight seal with another wall of the steel housing 70 by means of a conventional gland 68, the optical cable element 66 protruding into the housing. The central core 62 of the overhead conductor 61 and the optical cable element 66 of the optical cable 65 are each cut back to expose the optical fibres 63 and 67 and an optical fibre joint 64 is effected between the two optical fibres. The space within the stainless steel housing 70 is then filled with petroleum jelly 80 and the housing is then closed by a removable cover (not shown) in such a way that the housing is sealed to render it substantially fluid-tight.

Integral with the end of the sleeve 72 nearer the stainless steel housing 70 is a flange 73 which constitutes means by which a jumper cable can be electrically connected to the overhead conductor 61. The end of the steel housing 70 remote from the overhead electric conductor 61 carries a clevis or tongue 74 for mechanically connecting the stainless steel housing to an insulator or insulator string suspended from a tower.

In all cases, by appropriate selection of wall thickness and metal or metal alloy of the housing, the joint or dead end can have a strength equal to or substantially greater than the ultimate tensile strength of each or the overhead electric conductor.

What I claim as my invention is:

1. A method of effecting a joint between two overhead electric conductors to form a continuous conductor, or between a continuous overhead electric conductor and a cable extending to a spaced location, in an overhead electric and optical transmission system of the kind which includes at least one continuous overhead electric conductor comprising a substantially circumferentially rigid central core having an elongated compartment within and extending throughout the length of the core, at least one optical fibre loosely housed in the elongate compartment and, surrounding the central core, at least one layer of helically wound bare elongate elements of metal or metal alloy, which method comprises introducing at least a part of each or the overhead elecric conductor into a sleeve of metal or metal alloy of high electrical conductivity extending from a housing of metal or metal alloy; compression jointing the sleeve to the overhead electric conductor to effect a mechanical and electrical joint between the conductor and the housing; cutting back each or the conductor protruding into the housing and joining the fibres of the two overhead electric conductors or between the optical fibres of the overhead electric conductor and of the cable that has been introduced into the housing; and sealing the housing to render it substantially fluid-tight.

2. A method as claimed in claim 1, wherein the housing is separately formed with respect to each or the sleeve and the metal or metal alloy of the housing is of high electrical conductivity.

3. A method of effecting a joint between two overhead electric conductors as claimed in claim 1, wherein the sleeves to be compression jointed to the overhead electric conductors, constitute end parts of a tube which extends through, and protrudes from each end of, the metal housing and which at at least one position within the housing has at least one aperture through which the optical fibres of the overhead electric conductors can be withdrawn to enable the optical fibre joint to be effected.

4. A method of effecting a joint between two overhead electric conductors to form a continuous conductor in an overhead electric and optical transmission system of the kind which includes at least one continuous overhead electric conductor comprising a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, which method comprises cutting back each conductor to expose a length of optical fibre; introducing the cut back ends of the overhead electric conductors into the opposite ends of a tube of metal or metal alloy of high electrical conductivity constituting an elongate housing; compression jointing the ends of the tube to the overhead electric conductors to effect mechanical and electrical joints between the conductors and the tube; withdrawing the optical fibres of the overhead electric conductors through at least one aperture in the wall of the tube at a position intermediate of its ends and joining the optical fibres of the two overhead electric conductors; reintroducing the jointed optical fibres through the aperture into the tube; and sealing the tube to render it substantially fluid-tight.

5. A method as claimed in claim 4, wherein the tube is sealed by securing a metal plate of arcuate transverse cross-section over the aperture.

6. A method as claimed in claim 1, 4 or 3, wherein an elongate shroud of metal or metal alloy is assembled around the metal housing and is of such a transverse cross-sectional shape as to provide both aerodynamic and corona protection for the joint.

7. A method of effecting a joint between two overhead electric conductors to form a continuous conductor, or between a continuous overhead electric conductor and a cable extending to a spaced location, in an overhead electric and optical transmission system of the kind which includes at least one continuous overhead electric conductor comprising a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, which method comprises introducing at least a part of each or the overhead electric conductor into a tubular spigot extending from a housing of metal or metal alloy; applying a sleeve of metal or metal alloy of high electrical conductivity over each or the tubular spigot and over an adjacent part of the overhead electric conductor; compression jointing the sleeve to the tubular spigot and to the overhead electric conductor to effect a mechanical and electrical joint between the conductor and the housing; cutting back each or the conductor protruding into the housing and joining the optical fibres of the two overhead electric conductors or the optical fibres of the overhead electric conductor and of the cable that has been introduced into the housing; and sealing the housing to render it substantially fluid-tight.

8. A method as claimed in claim 7, wherein an elongate shroud of metal or metal alloy is assembled around the metal housing and is of such a transverse cross-sectional shape as to provide both aerodynamic and corona protection for the joint.

9. A method as claimed in claim 8, wherein each or the metal sleeve is integral with an end wall of the elongate shroud.

10. A method as claimed in claim 7, wherein each or the sleeve is compression-jointed to the associated tubular spigot before one of the overhead electric conductors or the overhead electric conductor is introduced through the tubular spigot into the housing.

11. A method as claimed in claim 10, wherein each or the sleeve is compression-jointed to the associated tubular spigot before the housing is taken to site.

12. A method as claimed in claim 1 or 7, wherein the layer or layers of helically wound bare metal elongate elements of each or the overhead electric conductor is or are cut back to expose a length of the central core, the exposed length of central core of each or the overhead electric conductor is introduced through one of the sleeves or the sleeve into the housing and, after each or the sleeve has been compression jointed to the overhead electric conductor, each or the exposed length of central core protruding into the housing is cut back to enable the optical fibre joint to be made.

13. A method as claimed in claim 1, 4 or 7, wherein the joint between the optical fibres is effected by fusion.

14. A method as claimed in claim 1, 4 or 7, wherein the joint between the optical fibres is secured in and with respect to the metal housing.

15. A method as claimed in claim 1, 4 or 7, wherein an excess length of each optical fibre to be connected at the joint is drawn into the housing to provide a spare length of optical fibre.

16. In an overhead electric transmission system of the kind in which at least one overhead electric conductor comprises a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, a joint between two overhead electric conductors, or between an overhead electric conductor and a cable extending to a spaced location, wherein the joint between the optical fibres of the overhead electric conductors, or of the overhead electric conductor and the cable, is enclosed within a substantially fluid-tight elongate housing of metal or metal alloy having protruding from each or one of its ends a sleeve of metal or metal alloy of high electrical conductivity through which at least a part of one of the overhead electric conductors, or of the overhead electric conductor, extends and which is compression jointed to said overhead electric conductor to provide a mechanical and electrical connection between the metal housing and said overhead electric conductor.

17. A joint as claimed in claim 16, wherein the elongate housing is separately formed with respect to each or the sleeve and the metal or metal alloy of the elongate housing is of high electrical conductivity.

18. A joint between two overhead electric conductors as claimed in claim 16, wherein the sleeves compression jointed to the overhead electric conductors constitute end parts of a tube which extends through, and protrudes from each end of, the metal housing and which at at least one position within the housing has at least one aperture through which the optical fibres of the overhead electric conductors protrude, the optical fibre joint being positioned between said tube and the elongate metal housing.

19. A joint as claimed in claim 16 or 18, wherein an exposed length of the central core of each or the overhead electric conductor protrudes through one of the sleeves or the sleeve into the metal housing.

20. A joint as claimed in claim 16 or 18, wherein the metal housing and each or the sleeve are made of aluminium or an aluminium-based alloy.

21. In an overhead electric transmission system of the kind in which at least one overhead electric conductor comprises a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, a joint between two overhead electric conductors, wherein the joint between the optical fibres of the overhead electric conductors is enclosed within a substantially fluid tight elongate housing constituted by a tube of metal or metal alloy of high electrical conductivity, and the ends of the tube are compression jointed to the overhead electric conductors to provide mechanical and electrical connections between the tube and the overhead electric conductors.

22. A joint as claimed in claim 21, wherein the tube has, at at least one position intermediate of its length, at least one aperture through which the optical fibres of the overhead electric conductors can be withdrawn to facilitate effecting of the optical fibre joint, the or each aperture being closed by an overlying metal plate of arcuate transverse cross-section secured to the tube to effect a fluid-tight seal.

23. A joint as claimed in claim 21, wherein the tube is of substantially circular transverse cross-section.

24. A joint as claimed in claim 23, wherein the tube has an external diameter which is substantially constant throughout the length of the tube.

25. A joint as claimed in claim 21 wherein the tube is made of aluminium or an aluminium-based alloy.

26. A joint as claimed in claim 16, 21 or 18, wherein an elongate shroud of metal or metal alloy surrounds the elongate metal housing and is of such a transverse cross-sectional shape as to provide both aerodynamic and corona protection for the joint.

27. A joint as claimed in claim 16, 21 or 18, wherein any space within the metal housing is filled with a petroleum-based water-impermeable jelly-like material.

28. A joint as claimed in claim 16, 21 or 18, wherein any space within the metal housing is filled with a cold setting resin.

29. A joint as claimed in claim 16, 21 or 18, wherein the metal housing also accomodates ancillary equipment associated with the optical transmission system.

30. In an overhead electric transmission system of the kind in which at least one overhead electric conductor comprises a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, a joint between two overhead electric conductors, or between an overhead electric conductor and a cable extending to a spaced location, wherein the joint between the optical fibres of the overhead electric conductors, or of the overhead electric conductor and the cable, is enclosed within a substantially fluid-tight elongate housing of metal or metal alloy having protruding from each or one of its ends a tubular spigot through which at least a part of one of the overhead electric conductors, or of the overhead electric conductor, extends and wherein the metal housing is mechanically and electrically connected to said overhead electric conductor by a sleeve of metal or metal alloy of high electrical conductivity which is compression jointed both to the tubular spigot and to the adjacent part of said overhead electric conductor.

31. A joint as claimed in claim 30, wherein an elongate shroud of metal or metal alloy comprising a circumferential wall and end walls surrounds the elongate metal housing and is of such a transverse cross-sectional shape as to provide both aerodynamic and corona protection for the joint.

32. A joint as claimed in claim 31, wherein each or the sleeve is integral with an end wall of the elongate shroud.

33. A joint as claimed in claim 31, wherein the shroud is of substantially cylindrical shape and of substantially circular cross-section.

34. A joint as claimed in claim 33, wherein the external circumferential edge of each end wall of the shroud is enclosed within a separately formed ring having a transverse cross-section of partially spherical shape, the ring serving as a corona ring.

35. A joint as claimed in claim 31, wherein the end walls of the shroud are separately formed with respect to the circumferential wall of the shroud and the circumferential wall is divided lengthwise of the shroud into two separately formed parts.

36. A joint as claimed in claim 35, wherein the circumferential wall of the shroud is sealed to the end walls to form a substantially fluid-tight chamber.

37. A joint as claimed in claim 35, wherein the circumferential wall of the shroud is provided with at least one hole for drainage of rain water.

38. A joint as claimed in claim 31, wherein the metal housing is made of metal or metal alloy of relatively low electrical conductivity and at least one strap of metal or metal alloy of high electrical conductivity extends between and is connected to the end walls of the shroud between the metal housing and the circumferential wall of the shroud.

39. A joint between an overhead electric conductor and a cable extending to a spaced location as claimed in claim 30, wherein a flange integral with the sleeve constitutes means for electrically connecting a jumper cable to the overhead electric conductor.

40. A joint as claimed in claim 39, wherein the cable extending to said spaced location effects a substantially fluid-tight seal with the wall of the metal housing.

41. In an overhead electric transmission system of the kind in which at least one overhead electric conductor comprises a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, a joint between two overhead electric conductors, or between an overhead electric conductor and a cable extending to a spaced location, wherein the joint between the optical fibres of the overhead electric conductors, or of the overhead electric conductor and the cable, is enclosed within a substantially fluid-tight elongate housing of metal or metal alloy having protruding from each or one of its ends a tubular spigot through which at least a part of one of the overhead electric conductors, or of the overhead electric conductor, extends and wherein the metal housing is mechanically and electrically connected to said overhead electric conductor by a sleeve of metal or metal alloy of high electrical conductivity which is compression jointed both to the tubular spigot and to the adjacent part of said overhead electric conductor, wherein an elongate shroud of metal or metal alloy comprising a circumferential wall and end walls surrounds the elongate metal housing and is of such a transverse cross-sectional shape as to provide both aerodynamic and corona protection for the joint, and wherein the metal housing is made of metal or metal alloy of relatively low electrical conductivity and at least one strap of metal or metal alloy of high electrical conductivity extends between and is connected to the end walls of the shroud between the metal housing and the circumferential wall of the shroud, and the or each strap has at least one kink between its ends.

42. In an overhead electric transmission system of the kind in which at least one overhead electric conductor comprises a substantially circumferentially rigid central core having an elongate compartment within and extending throughout the length of the core, at least one optical fibre loosely housed in the elongate compartment and, surrounding the central core, at least one layer of helically wound bare elongate elements of metal or metal alloy, a joint between two overhead electric conductors, or between an overhead electric conductor and a cable extending to a spaced location, wherein the joint between the optical fibres of the overhead electric conductors, or of the overhead electric conductor and the cable, is enclosed within a substantially fluid-tight elongate housing of metal or metal alloy having protruding from each or one of its ends a tubular spigot through which at least a part of one of the overhead electric conductors, or of the overhead electric conductor, extends and wherein the metal housing is mechanically, electrically connected to said overhead electric conductor by a sleeve of metal or metal alloy of high electrical conductivity which is compression jointed both to the tubular spigot and to the adjacent part of said overhead electric conductor, wherein a flange integral with the sleeve constitutes means for electrically connecting a jumper cable to the overhead electric conductor and wherein the end of the metal housing remote from the overhead electric conductor carriers a clevis or tongue for mechanically connecting the metal housing to an insulator suspended from a tower.

43. A joint as claimed in claim 42, wherein the cable extending to said spaced location effects a substantially fluid-tight seal with the wall of the metal housing.

* * * * *

UNITED STATES PATENT AND TRADEMARK OFFICE
CERTIFICATE OF CORRECTION

PATENT NO. : 4,494,822

DATED : January 22, 1985

INVENTOR(S) : PETER HARVEY

It is certified that error appears in the above-identified patent and that said Letters Patent is hereby corrected as shown below:

Column 2, line 50, change "on" to --one--.

Signed and Sealed this

Thirteenth Day of August 1985

[SEAL]

Attest:

DONALD J. QUIGG

Attesting Officer     Acting Commissioner of Patents and Trademarks